United States Patent
Engel et al.

(10) Patent No.: US 9,376,021 B2
(45) Date of Patent: Jun. 28, 2016

(54) METHOD OF INSTALLING A MOTOR IN A MACHINE

(71) Applicant: Caterpillar Global Mining Equipment LLC, Denison, TX (US)

(72) Inventors: Brett W. Engel, Shorewood, WI (US); Sean P. Kelly, Normal, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 168 days.

(21) Appl. No.: 14/332,518

(22) Filed: Jul. 16, 2014

(65) Prior Publication Data

US 2014/0325811 A1   Nov. 6, 2014

(51) Int. Cl.
*B60K 5/00* (2006.01)
*B60L 1/00* (2006.01)

(52) U.S. Cl.
CPC . *B60L 1/003* (2013.01); *B60K 5/00* (2013.01); *B60K 2005/003* (2013.01); *B60L 2200/40* (2013.01); *Y10T 29/49799* (2015.01)

(58) Field of Classification Search
CPC .................. Y10T 29/49963; Y10T 29/49902; Y10T 29/53961; Y10T 29/53974; B60K 5/00; B60K 2005/003; B60K 5/10; B60K 8/00; B62D 65/02
USPC .............................. 180/294; 254/92, 424, 124
See application file for complete search history.

(56) References Cited

U.S. PATENT DOCUMENTS

| | | | | |
|---|---|---|---|---|
| 2,904,287 A | * | 9/1959 | Ertsgaard | A01D 69/002 248/680 |
| 4,412,774 A | * | 11/1983 | Legrand | B64F 5/0036 180/298 |
| 4,770,427 A | * | 9/1988 | Howell | B60K 5/10 137/576 |
| 5,137,108 A | * | 8/1992 | Knowlton | B60K 5/10 180/298 |
| 6,050,358 A | * | 4/2000 | Kays | B60K 5/12 16/358 |

FOREIGN PATENT DOCUMENTS

| | | |
|---|---|---|
| CN | 201027134 | 2/2008 |
| CN | 202912549 | 5/2013 |
| CN | 203020423 | 6/2013 |
| FR | 2882043 | 8/2006 |
| IN | 201202758 | 9/2012 |
| JP | 2004050945 | 2/2004 |

\* cited by examiner

*Primary Examiner* — Jason L Vaughan
*Assistant Examiner* — Amanda Meneghini

(57) ABSTRACT

A method of installing a motor in a machine includes moving a tray coupled to a frame of the machine to a first position, securing the tray to the machine in the first position, placing the motor proximate to a first end of the tray, sliding the motor proximate to a second end of the tray, inserting at least two studs into apertures defined on the motor and corresponding mounting apertures defined in the frame, rotating a nut in a threaded engagement with a corresponding stud to raise the motor to an installed position, successively removing one of the studs from the aperture of the motor and the corresponding mounting aperture followed by inserting a mounting bolt therein. The method further includes moving the tray from the first position to a second position and securing the tray to the frame in the second position by one of the studs.

1 Claim, 7 Drawing Sheets

METHOD OF INSTALLING A MOTOR IN A MACHINE

TECHNICAL FIELD

The present disclosure relates to a method of installing a motor, and more specifically, to the method of installing a motor in a machine.

BACKGROUND

In machines, such as mining trucks, a motor needs to be installed below a frame or a platform of the machine. However, due to space constraints and limited access due to the surrounding structures and components, a crane or other overhead lifting devices may not be used to install and/or remove the motor. Additionally, due to a weight of the motor, it may be difficult and unsafe to lift and maneuver the motor manually. It may be also be cumbersome and dangerous to use tools, such as counterweighted tools, suspended from a crane to install and/or remove the motor due to lack of control. Further, such counterweighted tools may be difficult to maintain and transport. Moreover, there may be a possibility of misplacing the tools due to inefficient storage.

CN Patent Publication 202912549 (the '549 publication) relates to a hydraulic motor replacing device. The device includes a steel ring, bolts, nuts and a flying ring. The steel ring is fixedly connected with the flying ring and the nuts are fixed on the steel ring. The bolts extend into the steel ring and are connected with the nuts through thread pairs. The two nuts are arranged on two sides of the flying ring and form an included angle of 90 degrees with a center of the steel ring.

SUMMARY OF THE DISCLOSURE

In one aspect of the present disclosure, a method of installing a motor in a machine is provided. The method includes moving a tray coupled to a frame of the machine to a first position and securing the tray to the machine in the first position. The method also includes placing the motor proximate to a first end of the tray and sliding the motor proximate to a second end of the tray. The method further includes inserting at least two studs into apertures defined on the motor and corresponding mounting apertures defined in the frame. The method includes rotating a nut in a threaded engagement with a corresponding stud of the at least two studs to raise the motor to an installed position. The method also includes successively removing one stud of the at least two studs from the aperture of the motor and the corresponding mounting aperture of the frame followed by inserting a mounting bolt into the aperture of the motor and the corresponding mounting aperture of the frame. The method further includes releasing the tray from the first position, moving the tray to a second position angularly displaced relative to the first position, and securing the tray to the frame in the second position by one stud of the at least two studs.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
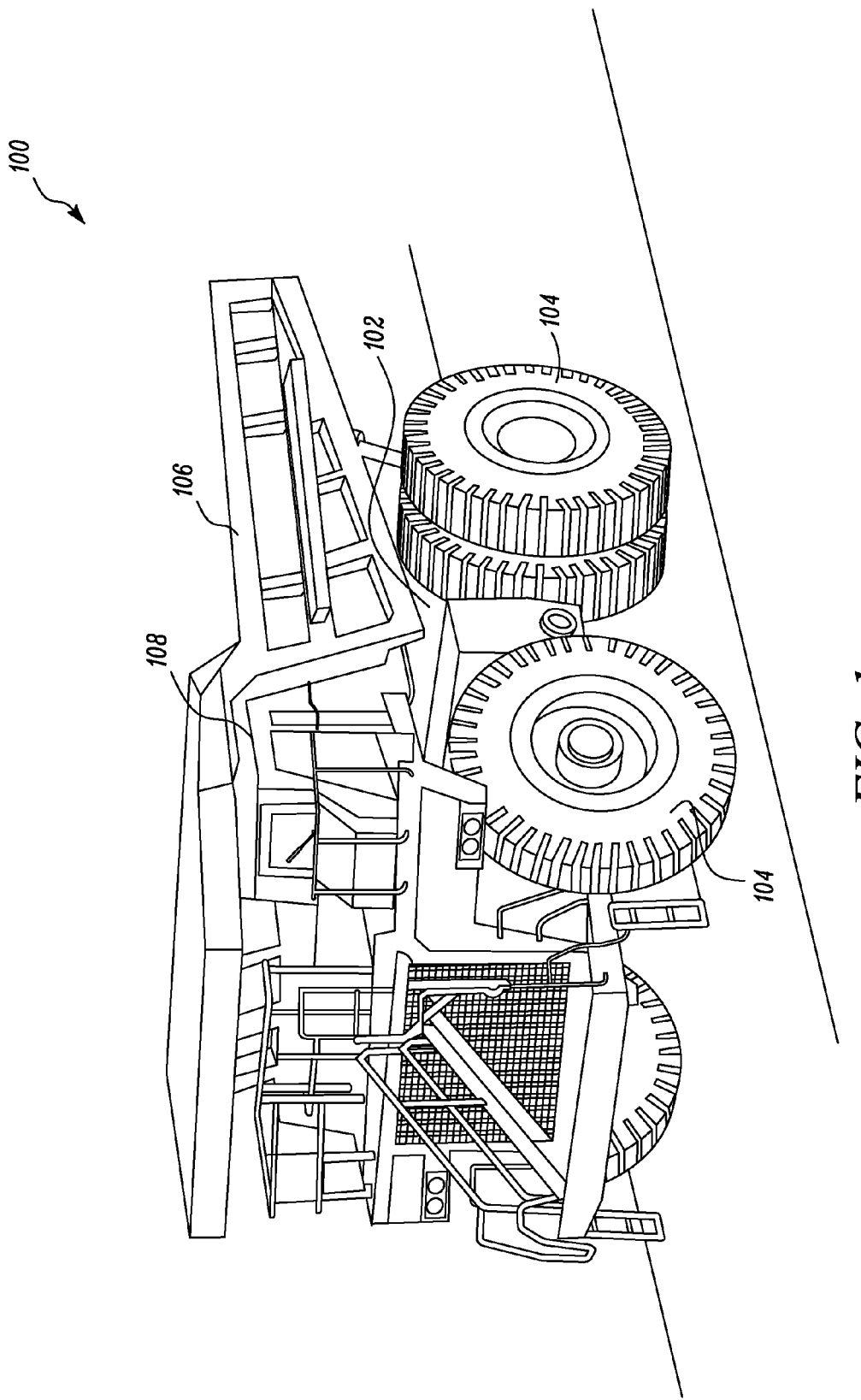
FIG. 1 is a perspective view of an exemplary machine.

FIG. 1 illustrates an exemplary machine 100. The machine 100 is illustrated as a mining truck in FIG. 1. However, in various alternative embodiments, the machine 100 may be any other machine related to an industry such as construction, agriculture, forestry, transportation, material handling, waste management, and so on. Accordingly, the machine 100 may be a backhoe loader, a track type tractor, a compactor, an excavator, a skid steer loader, and the like.

The machine 100 includes a machine frame 102 supported by one or more ground engaging members 104, such as wheels. The ground engaging members 104 are configured to provide mobility to the machine 100 on ground. The machine 100 further includes a dump body 106 which may be pivotal relative to the machine frame 102. The machine 100 also includes an operator cabin 108 which includes various operator controls and displays used to operate the machine 100.

The machine 100 also includes a power source. The power source is configured to provide power to the machine 100 for operational and mobility requirements. The power source may be housed inside the machine frame 102. In an embodiment, the power source includes an internal combustion engine (not shown) drivably coupled with an alternator 112 (shown in FIG. 2). The alternator 112 may be configured to generate electric power which may be used to power one or more components of the machine 100, for example, the ground engaging members 104. For example, the alternator 112 may provide electric power to one or more traction motors (not shown) which are drivably coupled to the ground engaging members 104. During operation, the alternator 112 and the traction motors (not shown) may generate heat and require cooling. The machine 100 includes a blower 116 (shown in FIG. 3) to blow air over the alternator 112 and traction motors in order to provide cooling. Further, a motor 114 may be provided to drive an impeller (not shown) of the blower 116. The motor 114 may be an electric motor, hydraulic motor, pneumatic motor, and the like.

FIGS. 2 to 6 illustrate a system 118 for installing the motor 114 in the machine 100, according to an embodiment of the present disclosure. Specifically, the motor 114 is installed on a frame 120 of the blower 116. The frame 120 includes an upper portion 122 upon which the blower 116 is mounted.

Figure 2:
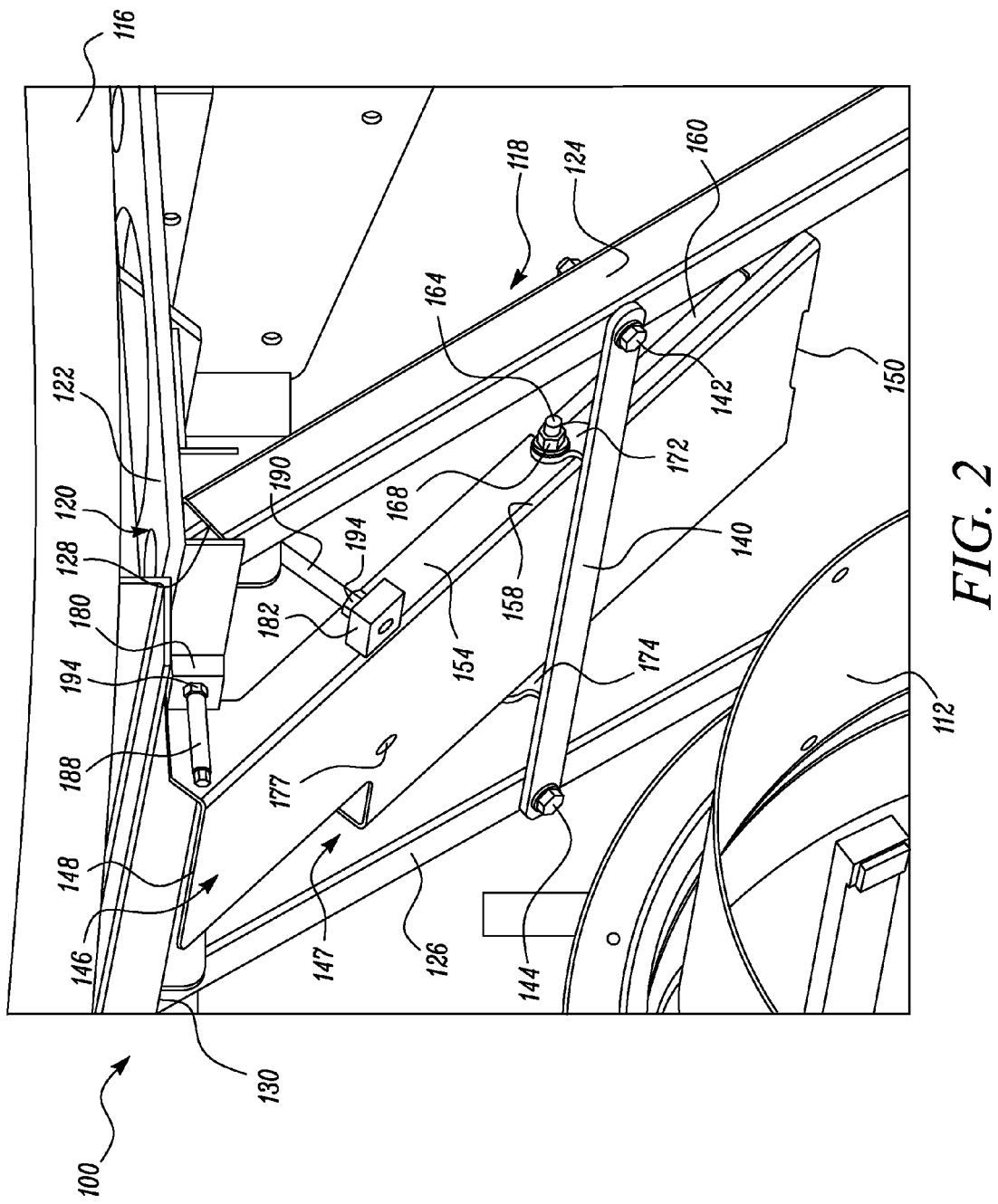
FIG. 2 is a perspective view of a system for installing a motor in the machine showing a tray of the system in a second position, according to an embodiment of the present disclosure.
Figure 3:
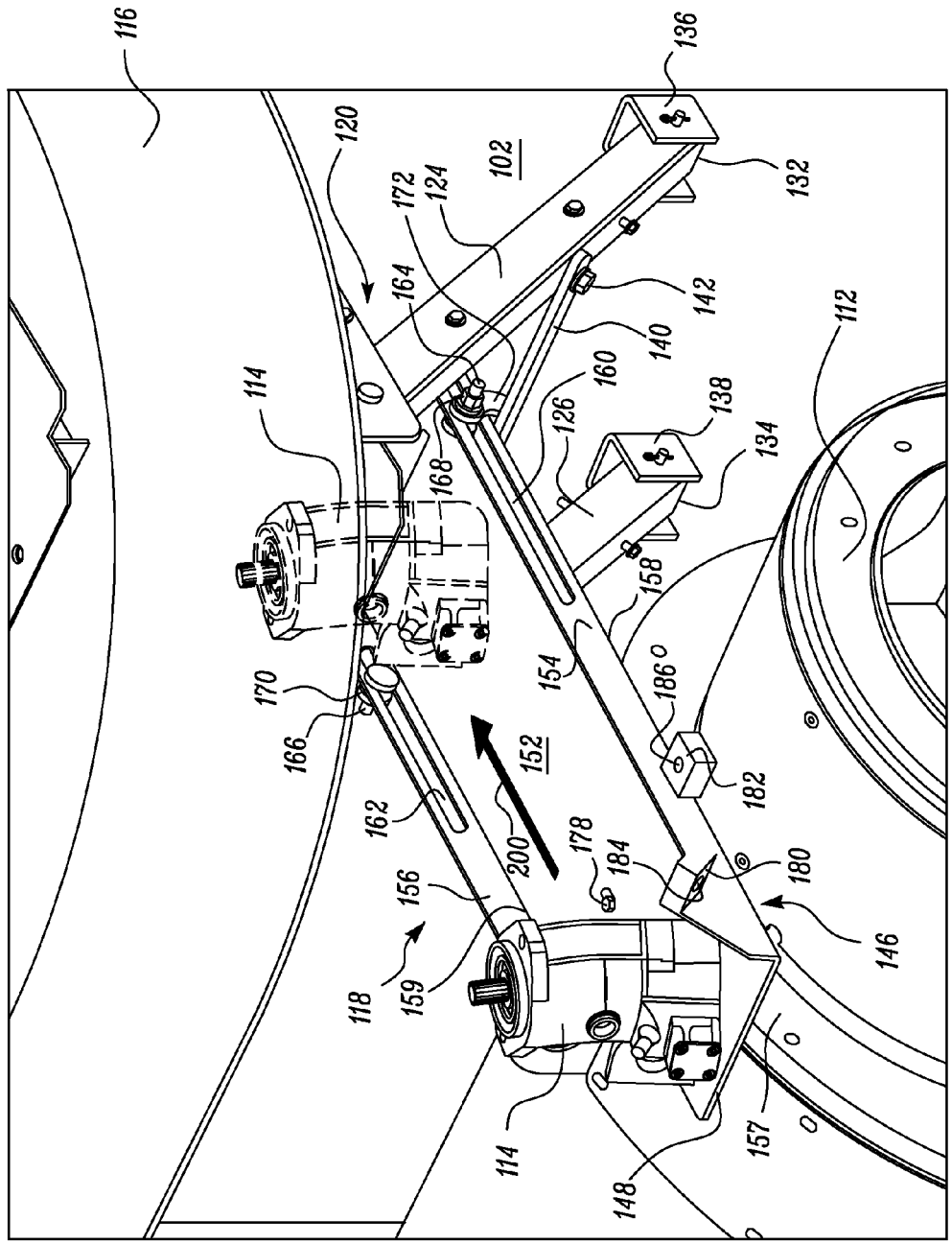
FIG. 3 is a perspective view of the system showing the tray in a first position.

As shown in FIGS. 2 and 3, the frame 120 further includes two rails 124, 126 having first ends 128, 130 and second ends 132, 134 respectively. The two rails 124, 126 are configured to support the upper portion 122 of the frame 120. The rails 124, 126 may be obliquely oriented relative to the upper portion 122 of the frame 120. The first ends 128, 130 of the rails 124, 126 may be coupled to the upper portion 122 by fasteners. Further, the second ends 132, 134 are coupled to the machine frame 102. In the illustrated embodiment, the second ends 132, 134 are coupled to brackets 136, 138 by fasteners. The brackets 136, 138 may be attached to the machine frame 102 by any method known in the art such as, but not limited to, welding, soldering, brazing, using fasteners and the like.

The system 118 includes an elongate member 140 that is attached to the rails 124, 126 at an intermediate location between the first ends 128, 130 and the second ends 132, 134. As illustrated in FIGS. 2 and 3, the elongate member 140 extends across the rails 124, 126. In the illustrated embodiment, the elongate member 140 is attached to the rails 124, 126 by bolts 142, 144. In another embodiment, the elongate member 140 may be welded to the rails 124, 126. Alternatively, the elongate member 140 and at least one of the rails 124, 126 may be integral and manufactured as a unitary component.

The system 118 further includes a tray 146 having a first end 148 and a second end 150. The tray 146 includes a planar portion 152 and sidewalls 154, 156 that project from a first edge 158 and a second edge 159 of the planar portion 152, respectively. Further, the sidewall 156 may not extend to the second edge 159. The planar portion 152 of the tray 146 may define a cutout portion 147 adjacent to the sidewall 156. The cutout portion 147 may be substantially L-shaped.

Further, each of the sidewalls 154, 156 defines lateral slots 160, 162 proximate to the second end 150 of the tray 146. The tray 146 is coupled to the elongate member 140 through pivot bolts 164, 166 and associated nuts 168, 170. The pivot bolts 164, 166 are inserted into the lateral slots 160, 162 such that bolts heads associated with the pivot bolts 164, 166 abut against inner surfaces of the respective sidewalls 154, 156. The pivot bolts 164, 166 further extend through holes defined in corresponding extensions 172, 174 associated with the elongate member 140. Washers (not shown) may also be disposed on the pivot bolts 164, 166. As such, the sidewalls 154, 156 of the tray 146 and the extensions 172, 174 of the elongate member 140 are held against each other between the bolt heads and the nuts 168, 170. In a tightened state of the pivot bolts 164, 166 and the nuts 168, 170, pivoting of the tray 146 relative to the elongate member 140 may be prevented. When the pivot bolts 164, 166 and the nuts 168, 170 are loosened, the tray 146 may be pivoted relative to the elongate member 140.

Further, as the pivot bolts 164, 166 are slidable within the lateral slots 160, 162, respectively; the tray 146 may be displaced linearly relative to the elongate member 140. However, it may also be contemplated to provide other telescopic arrangements to facilitate linear displacement of the tray 146.

The tray 146 further includes a first block 180 and a second block 182 attached to the sidewall 154. The first block 180 may be located adjacent to the first end 148 of the tray 146. The second block 182 is located between the first block 180 and the lateral slot 160. In the illustrated embodiment, the first block 180 is disposed at an angle with respect to the first sidewall 154, and the second block 182 lie in a plane of the planar portion 152 of the tray 146. The first block 180 and the second block 182 may be welded to the sidewall 154. Alternatively, the first block 180 and the second block 182 may be integrally formed with the tray 146.

Each of the first block 180 and the second block 182 define threaded openings 184, 186 therethrough (shown in FIG. 3). The openings 184, 186 are configured to receive the studs 188, 190 therein. The studs 188, 190 include external threads to engage with the threads of the openings 184, 186. Alternatively, the openings 184, 186 may not be threaded, and the studs 188, 190 are coupled to the first and second blocks 180, 182 by respective nuts 192, 194 (shown in FIG. 5) and washers 196, 194 (shown in FIG. 5).

A second position of the tray 146 is illustrated in FIG. 2. In the second position, the tray 146 may be coupled to the frame 120 by at least one of the studs 188, 190, and the associated nuts 192, 194 and washers 196, 198. For example, the stud 188 may be inserted through the opening 184 of the first block 180 and a corresponding opening (not shown) defined in the upper portion 122 of the frame 120 to couple the tray 146 to the frame 120. Alternatively, other fastening means such as screws, bolts may be used to couple the tray 146 to the frame 120. In the second position, the tray 146 is linearly located relative to the elongate member 140 such that the pivot bolts 164, 166 are located adjacent to ends of the lateral slots 160, 162. Such a location of the tray 146 may enable the tray 146 to be accommodated between the rails 124, 126 without contacting the upper portion 122 of the frame 120. The tray 146 may be retained in the second position, after installation and/or removal of the motor 114, such that the system 118 does not interfere with an operation of the machine 100.

During installation of the motor 114, the pivot bolts 164, 166 and the corresponding nuts 168, 170 may be loosened, and the tray 146 may be uncoupled from the upper portion 122 of the frame 120. The tray 146 may be then lowered down from the second position. The tray 146 may be further displaced linearly relative to the elongate member 140 to the first position, as illustrated in FIG. 3. The first position of the tray 146 may be therefore angularly and linearly displaced relative to the second position. In the first position, the pivot bolts 164, 166 may be located adjacent to opposite ends of the lateral slots 160, 162 with respect to the ends in the second position. Further, the studs 188, 190 and the associated nuts 192, 194 and washers may be removed from the first block 180 and the second block 182. It may be contemplated that the tray 146 may only be pivotal relative to the elongate member 140 and any relative linear motion may not be present. In such a case, the upper portion 122 may be located at a height which permits pivotal motion of the tray 146 without requiring any sliding motion. Further, the lateral slots 160, 162 may not be provided.

In the first position, the tray 146 may rest on a cover 157 of the alternator 112. Further, the tray 146 may be secured in the first position via a fastener 178 passing through a hole 177 defined in the planar portion 152 (shown in FIG. 2) and a corresponding opening (not shown) in the cover 157. The fastener 178 may be a bolt and nut arrangement, a screw, and the like. The tray 146 may be angularly displaced from the first position to the second position and coupled to the frame 120 in the second position via the studs 188, 190.

Further, in the first position, the motor 114 is positioned proximate to the first end 148 of the tray 146. In an embodiment, the motor 114 may be positioned on the tray 146 using a crane. However, it may be contemplated that any other hoisting or lifting devices known in the art may be used to position the motor 114 on the tray 146. The cutout 147 may facilitate the placement of the motor 114 proximate the first end 148 without any interference from the sidewall 156. The motor 114 may be then slid on the tray 146 along a direction 200 such that the motor 114 may be positioned proximate to the second end 150. The motor 114 may be slid towards the second end 150 either manually or by any device known in the art.

Figure 4:
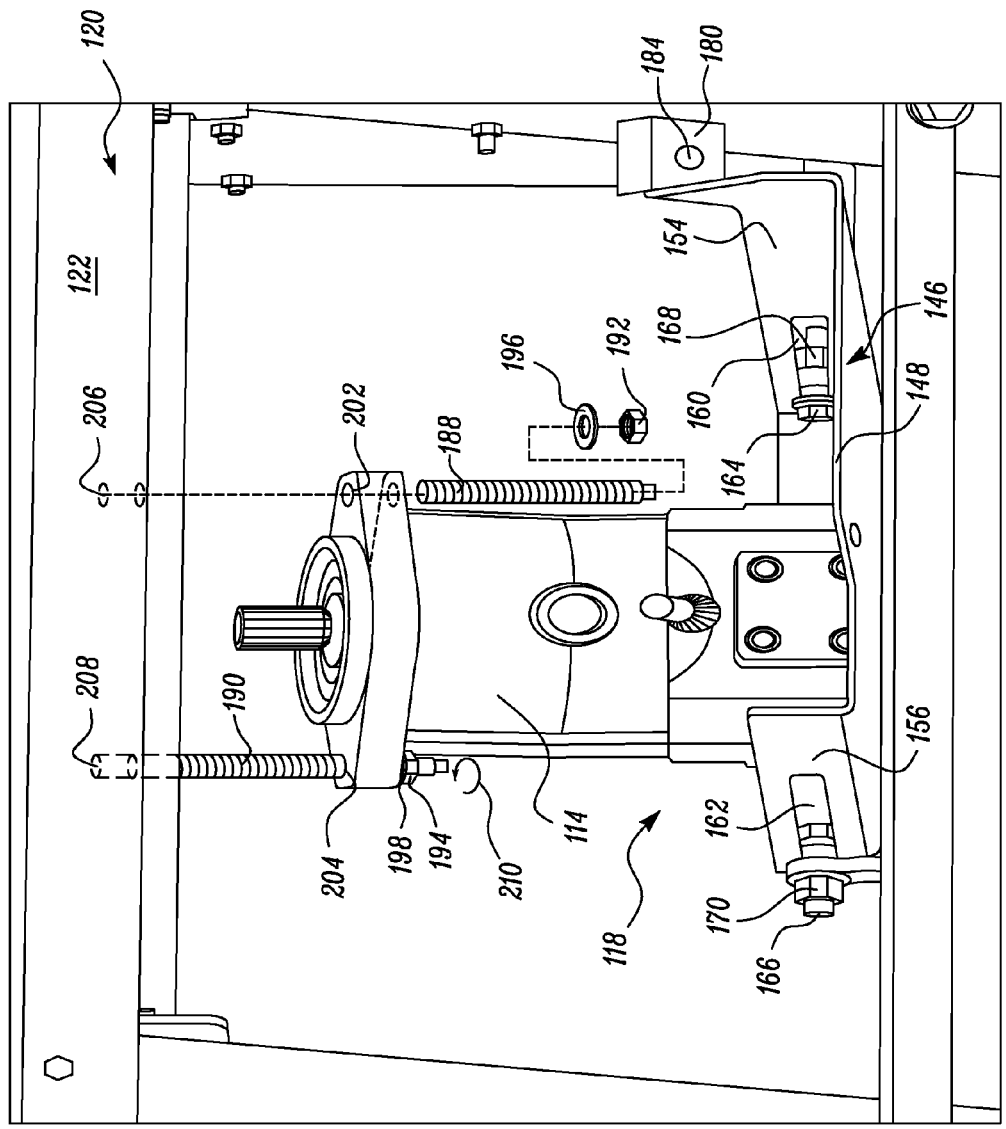
FIG. 4 is a perspective view of the system showing studs inserted into apertures of the motor and corresponding mounting apertures of a frame.

As illustrated in FIG. 4, the motor 114 is positioned proximate to the second end 150. Further, the studs 188, 190 are inserted into apertures 202, 204 of the motor 114 and corresponding mounting apertures 206, 208 defined in the upper portion 122 of the frame 120. In an embodiment, the mounting apertures 206 of the frame 120 may be threaded such that the studs 188, 190 are threadingly engaged with the frame 120. The washers 196, 198 and the nuts 192, 194 are engaged with the studs 188, 190 adjacent to the apertures 202, 204 to retain the motor 114 on the studs 188, 190, respectively. Upon rotation of the nuts 192, 194, in a direction 210, the motor 114 moves towards the frame 120 and is subsequently raised to the installed position (shown in FIG. 5).

Figure 5:
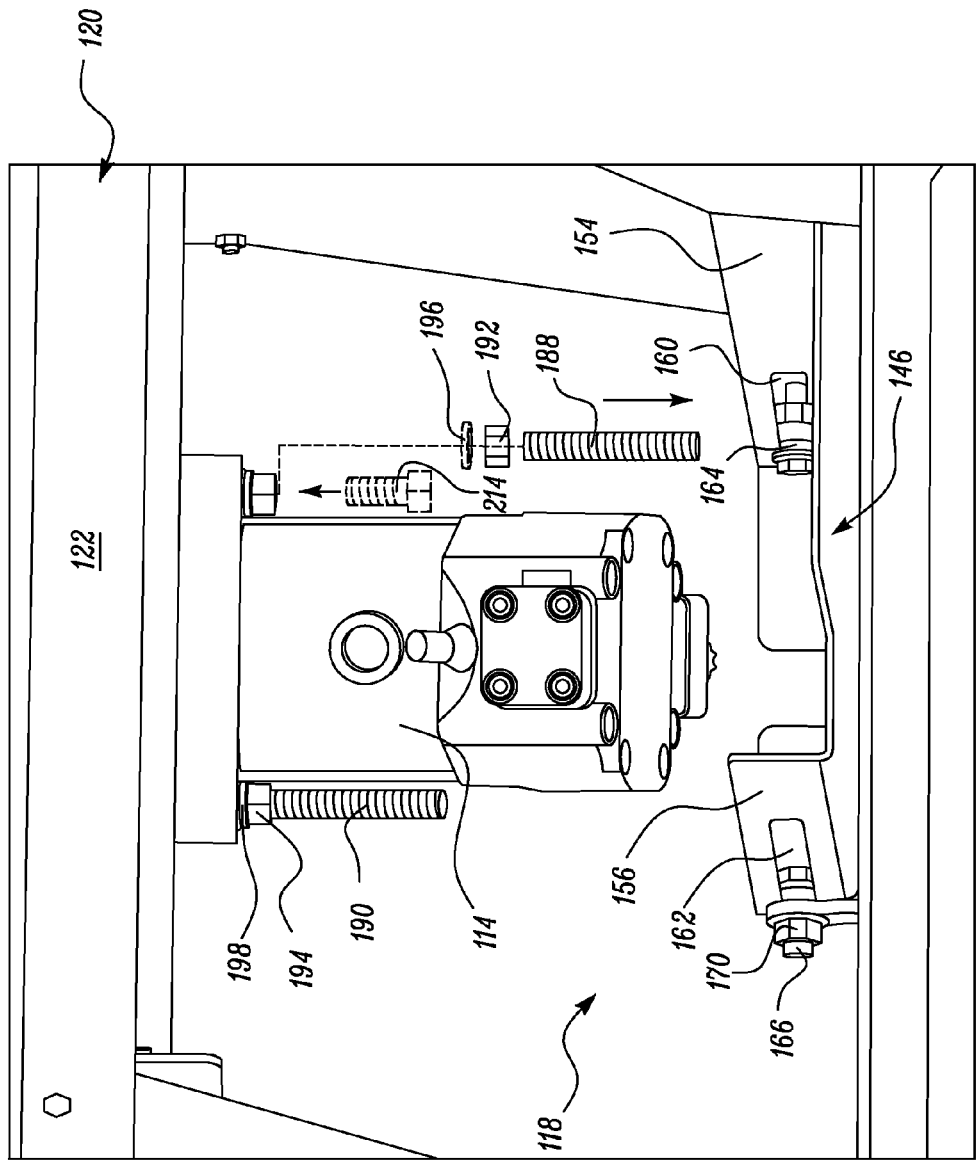
FIG. 5 is a perspective view of the system showing the studs being replaced by mounting bolts.
Figure 6:
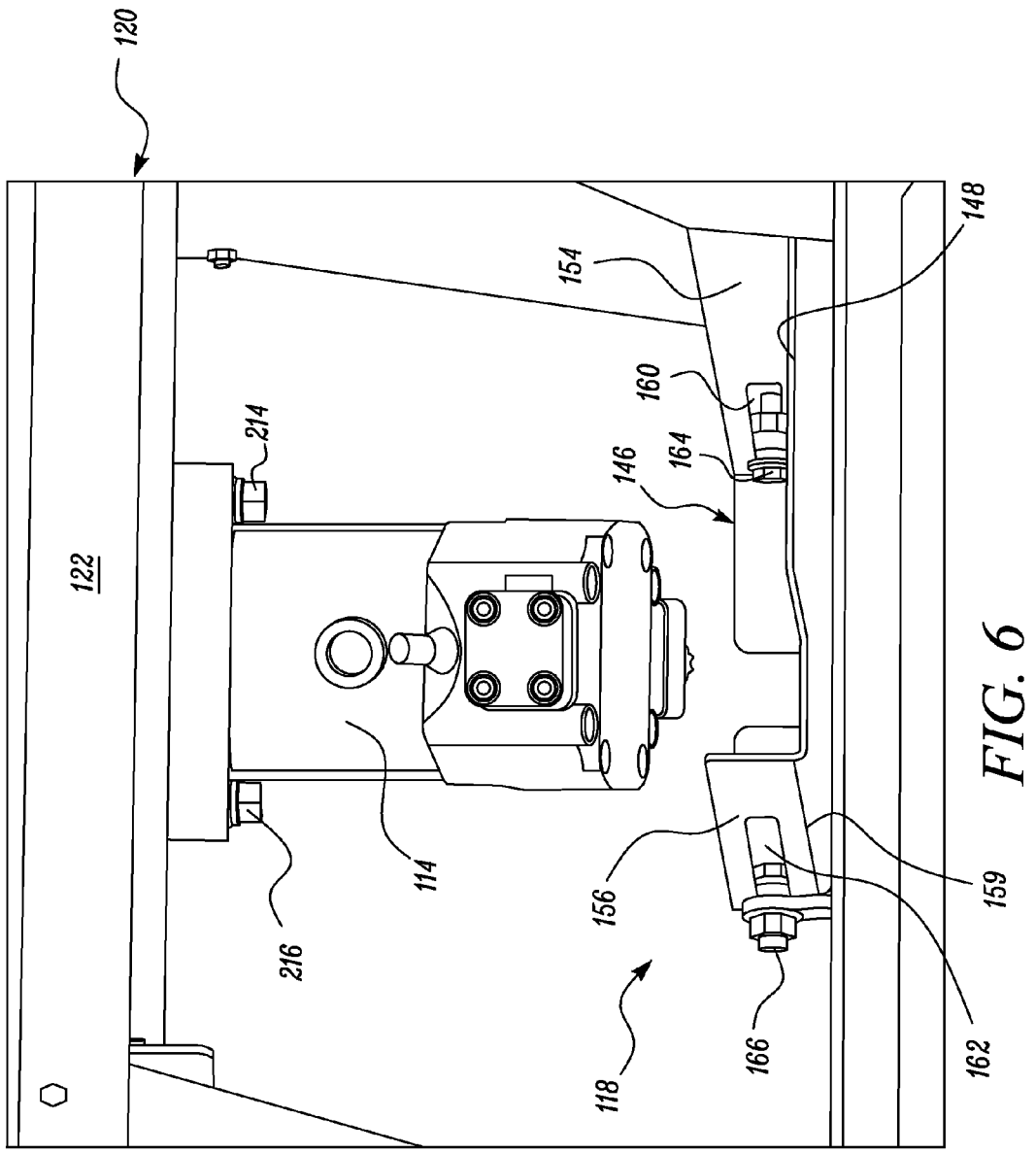
FIG. 6 is a perspective view of the system showing the mounting bolts holding the motor in an installed position.
Figure 7:
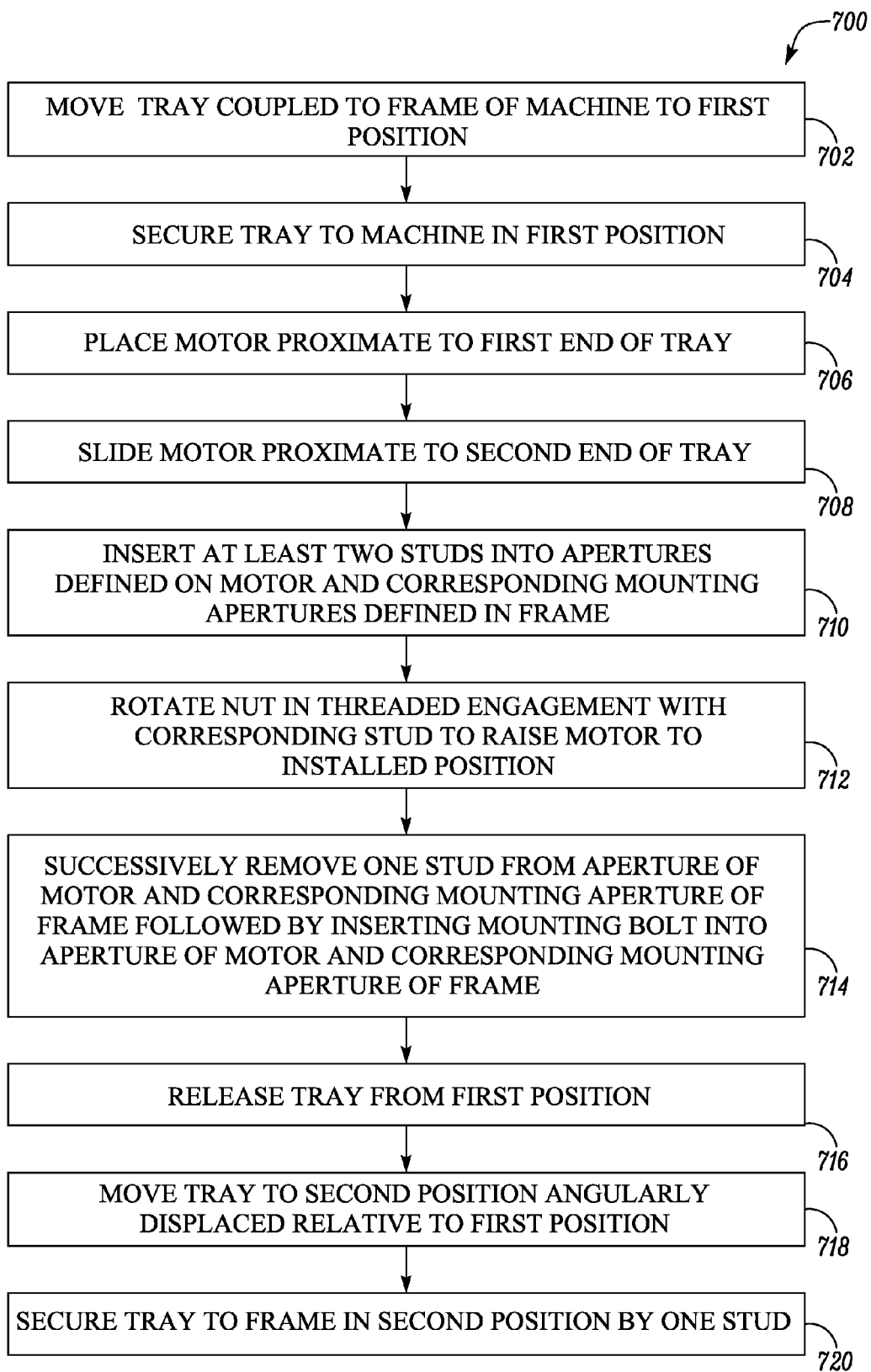
FIG. 7 is a flowchart of a method of installing the motor in the machine, according to an embodiment of the present disclosure.

As illustrated in FIG. 5, the stud 188, the washer 196, the nut 192 are replaced by a mounting bolt 214. The nut 192 may be rotated in direction opposite to the direction 210 to disengage the nut 192 from the stud 188. The washer 196 may also be removed. The stud 188 may be then removed from the aperture 202 of the motor 114 and the corresponding mounting aperture 206. The mounting bolt 214 is inserted through the aperture 202 and the corresponding mounting aperture 206 and subsequently tightened. A washer may also be provided along with the mounting bolt 214. During such replacement, the motor 114 is held in the installed position via the other stud 190. The stud 190 is then removed from the aperture 204 and the corresponding mounting aperture 208, and replaced with a mounting bolt 216. Hence, the motor 114 is coupled to the upper portion 122 of the frame 120 in threaded engagement via the mounting bolts 214, 216. FIG. 6 illustrates the motor 114 held in the installed position by the mounting bolts 214, 216.

It may be apparent to a person ordinarily skilled in the art that the number of studs may not be limited to two, and may vary based on the number of apertures of the motor 114 and the corresponding apertures of the frame 120. In such case, each of the studs may be successively replaced by the mounting bolts in a desired sequence.

Although, embodiments of the present disclosure are explained in conjunction with the motor 114 associated with the machine 100, it may be envisioned to use the system 118 to install or remove any type of components associated with various machines.

INDUSTRIAL APPLICABILITY

In machines, such as mining trucks, the motor may have to be installed below a frame or a platform of the machine. Conventional lifting devices, such as cranes, may not be employed due to space constraints. Further, manually lifting the motor may be unsafe due to a weight of the motor.

The present disclosure is related to a method 700 of installing the motor 114 in the machine 100. The method 700 may employ the system 118 described above. At step 702, the method 700 includes moving the tray 146 to the first position. The tray 146 may be lowered to the first position by uncoupling the tray 146 from the frame 120 by removing the stud 188 from the frame 120. After lowering the tray 146 from the second position, the tray 146 may be further slid linearly to the first position. At step 704, the method 700 includes securing the tray 146 to the machine 100 in the first position. The tray 146 may be secured to the cover 157 of the alternator 112 in the first position via the fastener 178.

At step 706, the method 700 includes placing the motor 114 proximate to the first end 148 of the tray 146. The motor 114 may be lowered onto the tray 146 by any lifting or hoisting device known in the art, such as cranes. At step 708, the method 700 includes sliding the motor 114 proximate to the second end 150 of the tray 146. The motor 114 may be slid towards the second end 150 either manually or by any device known in the art.

At step 710, the method 700 includes inserting the studs 188, 190 into the apertures 202, 204 and the corresponding mounting apertures 206, 208. At step 712, the method 170 includes rotating the nuts 192, 194 that are in threaded engagement with the respective studs 188, 190 to raise the motor 114 to the installed position. At step 714, the method 700 includes successively replacing one of the studs 188, 190 from the respective apertures 202, 204 and the corresponding mounting apertures 206, 208 with one of the mounting bolts 214, 216.

At step 716, the method 700 includes releasing the tray 146 from the first position. The tray 146 may be released from the first position by removing the fastener 178 from the hole 177 and the cover 157 of the alternator 112. At step 718, the method 700 includes moving the tray 146 to the second position. The tray 146 may be moved to the second position by sliding the tray 146 and subsequently pivoting the tray 146. At step 720, the method 700 includes securing the tray 146 in the second position by coupling the studs 188 with the opening of the frame 120.

It may be contemplated that the system 118 may also be used to remove or replace the motor 114. A method of removing/replacing the motor 114 from the machine 100 may include lowering the tray 146 from the second position to the first position. The tray 146 may be then secured to the machine 100 in the first position. The mounting bolts 214, 216 are then successively replaced with the studs 188, 190. The nuts 192, 194 are rotated to lower the motor 114 onto the tray 146. The motor 114 is then slid from the second end 150 and towards the first end 148 of the tray 146. A crane or other lifting device may be employed to remove the motor 114 from the tray 146. Then the steps 716 to 720 of the method 700 may be employed to secure the tray 146 in the second position.

The method 700 and the system 118 may enable installation and/or removal of the motor 114 from the machine 100 with minimal manual lifting or maneuvering of the motor 114. Moreover, the mechanical advantage provided by threads of the studs 188, 190 and the respective nuts 192, 194, while raising and/or lowering of the motor 114, may enable usage of manual tools, such as a wrench, spanner or any other hand-held tools.

The system 118 includes the tray 146 that can be pivotally and slidingly coupled to the frame 120. As such, the tray 146 may be secured to the second position in an available space, and hence the system 118 need not be removed or disassembled during normal operation of the machine 100. After installation and/or removal, the studs 188, 190, and the respective nuts 192, 194 and the washers 196, 198 may be coupled to the first and blocks 180, 182 thereby preventing loss of the components during operation of the machine 100. At least one of the studs 188, 190 may also have an additional function of securing the tray 146 in the second position, thereby reducing a number of components of the system 118. Further, the system 118 may be easily retrofitted in an existing machine 100 with minimal modifications.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of installing a motor in a machine, the method comprising:

moving a tray coupled to a frame of the machine to a first position;
securing the tray to the machine in the first position;
placing the motor proximate to a first end of the tray;
sliding the motor proximate to a second end of the tray;
inserting at least two studs into apertures defined on the motor and corresponding mounting apertures defined in the frame;
rotating a nut in a threaded engagement with a corresponding stud of the at least two studs to raise the motor to an installed position;
successively removing one stud of the at least two studs from the aperture of the motor and the corresponding mounting aperture of the frame followed by inserting a mounting bolt into the aperture of the motor and the corresponding mounting aperture of the frame;
releasing the tray from the first position;
moving the tray to a second position angularly displaced relative to the first position; and
securing the tray to the frame in the second position by one stud of the at least two studs.

* * * * *